C. LE G. FORTESCUE.
ELECTRICAL DISTRIBUTING SYSTEM.
APPLICATION FILED JULY 3, 1916.

1,250,835.

Patented Dec. 18, 1917.
3 SHEETS—SHEET 1.

WITNESSES:
P. J. Fitzgerald
Geo. W. Hansen.

INVENTOR
Charles Le G. Fortescue.
BY
Wesley G. Carr
ATTORNEY

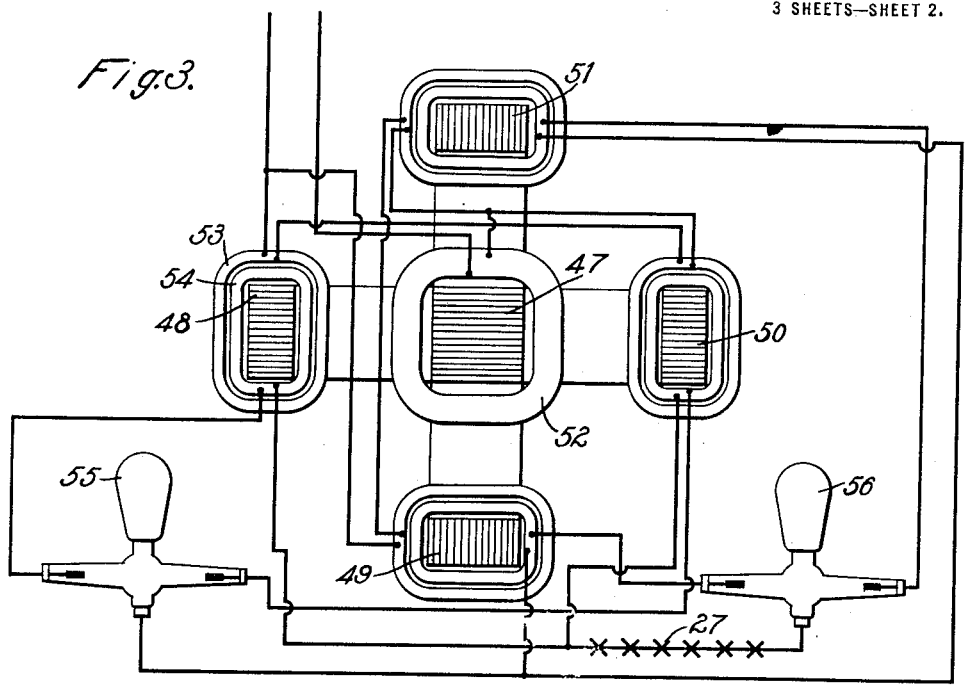
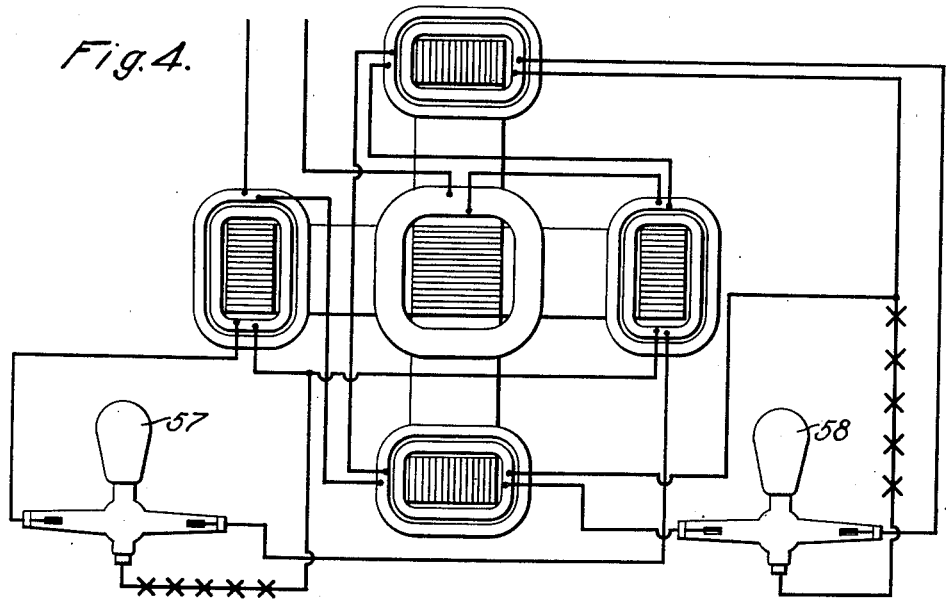

C. LE G. FORTESCUE.
ELECTRICAL DISTRIBUTING SYSTEM.
APPLICATION FILED JULY 3, 1916.

1,250,835.

Patented Dec. 18, 1917.
3 SHEETS—SHEET 3.

WITNESSES:
R. J. Fitzgerald.
Geo. W. Hansen.

INVENTOR
Charles Le G. Fortescue.
BY
Wesley G. Carr
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL DISTRIBUTING SYSTEM.

1,250,835.     Specification of Letters Patent.     Patented Dec. 18, 1917.

Original application filed June 21, 1912, Serial No. 705,011. Divided and this application filed July 3, 1916. Serial No. 107,255.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Electrical Distributing Systems, of which the following is a specification, this application being a division of application, Serial No. 705,011, filed June 21, 1912.

My invention relates to electrical systems of distribution, and it has special relation to alternating-current rectifying systems comprising constant-current regulators.

An object of my invention is to provide a current-rectifying system which comprises an alternating-current supply circuit and a constant-current circuit that is furnished with rectified current through a current rectitifying apparatus and a suitable regulator, the latter serving as a potential transformer, a constant-current regulator, and a sustainer to minimize the pulsations in the rectified current wave.

In one of its simplest forms, the present system may be employed in connection with mercury-vapor rectifying devices with which it is desirable to provide the proper amount of sustaining effect in order to smooth out the rectified-current wave.

Figure 1:
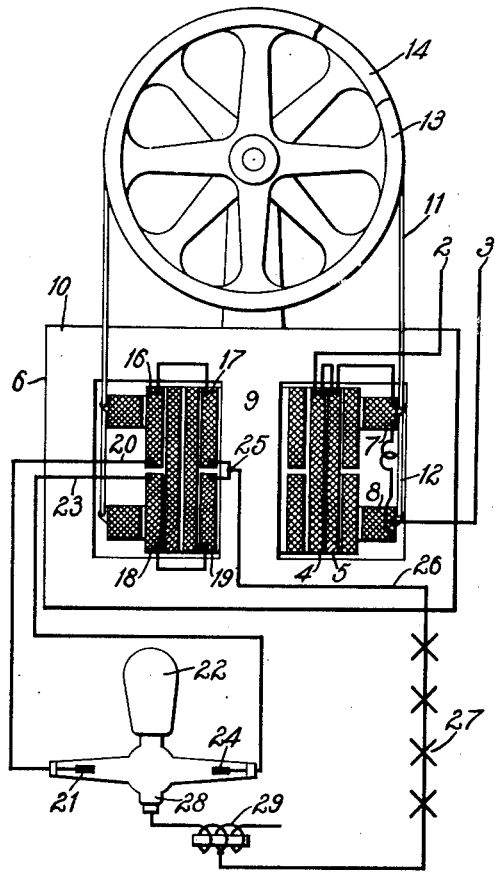
Figure 2:
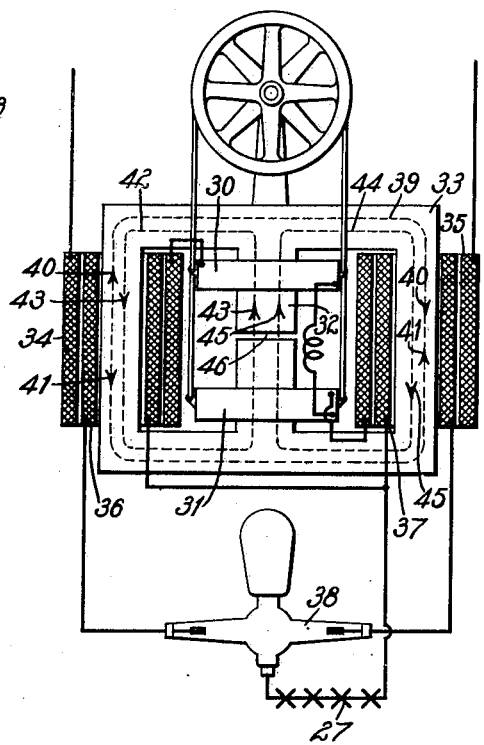
Figure 5:
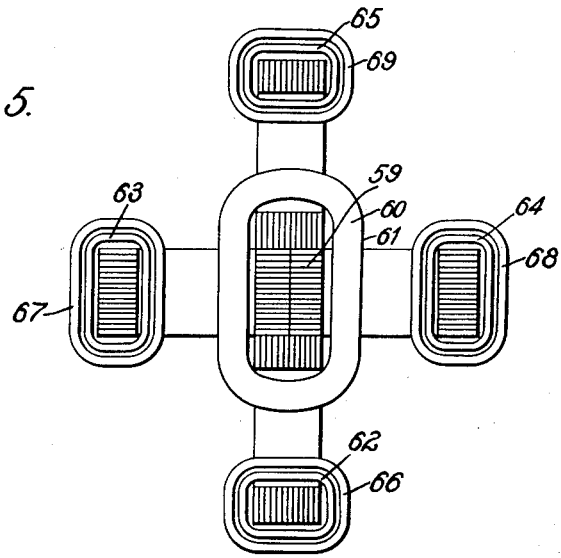
Figure 6:
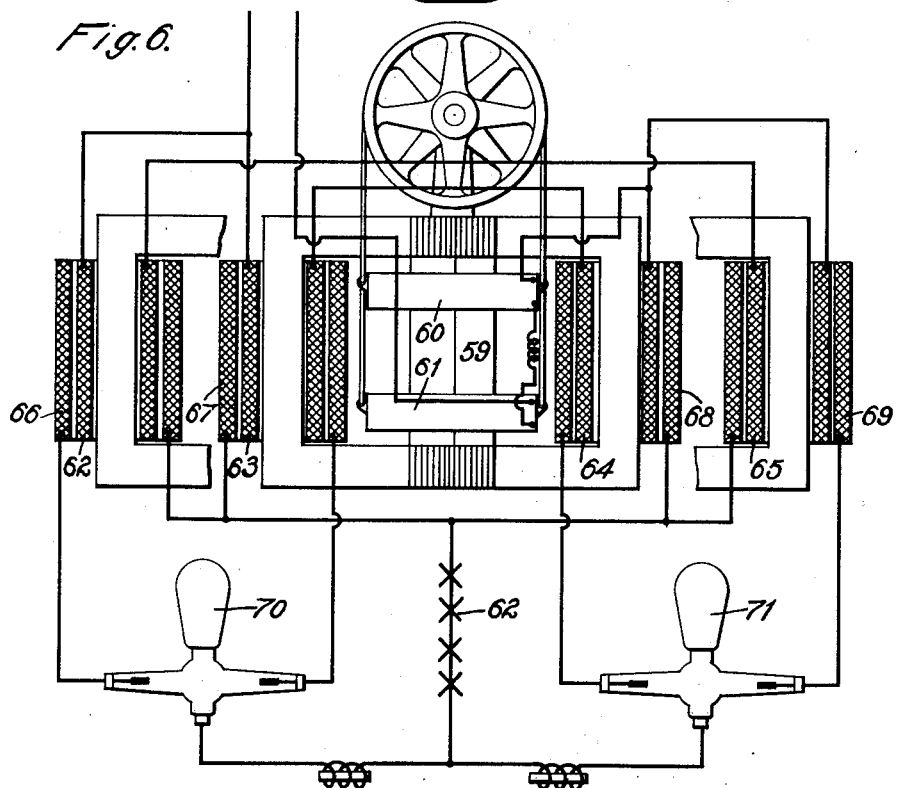

For a better understanding of the nature and scope of my invention, reference may be had to the following description and the accompanying drawings in which Figure 1 is a diagrammatic representation of a distributing system embodying a form of my invention, the regulator, in this instance, effecting voltage transformation between the alternating-current supply circuit and the rectified-current circuit, in addition to maintaining a constant-current flow in the load circuit; Fig. 2 is a diagrammatic representation of a distributing system embodying a form of my invention in which the regulator is adapted to supply constant current to a current rectifier and, at the same time, to provide the proper amount of sustaining effect for the rectified current; Figs. 3 and 4 are diagrammatic views of modified forms of the systems shown in Figs. 1 and 2, the regulators shown, however, being associated with a plurality of current rectifiers; Fig. 5 is a plan and sectional view, and Fig. 6 is a side and diagrammatic view of a modified form of a regulator which is adapted to supply current to a plurality of parallel-connected rectifiers.

Referring to Fig. 1, alternating-current supply mains 2 and 3 are connected to two series-connected stationary coils 4 and 5, and also two movable coils 7 and 8 of a regulator 6, all of said coils being connected in series and the movable coils 7 and 8 surrounding the inner stationary coils 4 and 5. The coils embrace a central core leg 9 of a magnetizable core member 10 of any suitable form, here shown as being of the shell-type construction. The movable coils 7 and 8, which comprise a part of the primary winding of the potential transformer, have the same number of convolutions and are so connected in circuit that they produce fluxes in opposite directions in the core member 10 under load and no-load conditions. They are carried by chains or cables 11 and 12 that pass over sheaves or pulleys 13 and 14, respectively, one end of the chain 11 being connected to one side of the coil 7 and the other end being connected to the opposite side of the coil 8, and the chain 12 being connected in the reverse manner. The coil 7 is weighted so as to be somewhat heavier than the coil 8 in order that the said coils may be close together when the regulator is disconnected from circuit.

The secondary winding of the potential transformer comprises four coils 16, 17, 18 and 19, two surrounding the upper end of the middle leg 9 of the core and two surrounding the lower end thereof, the primary coils 4 and 5 being interposed between the secondary coils at each end of the leg 9 of the core member and extending from end to end thereof. The primary and secondary coils of the potential transformer, being in close inductive relation, permit the desired voltage transformation to be efficiently obtained, while, at the same time, the regulator coils 7 and 8 will automatically introduce the proper reactance into the primary or alternating-current supply circuit for the purpose of maintaining the current in the secondary or rectified-current circuit substantially uniform.

The secondary coils 16 and 17 are connected in series relationship with each other, one terminal 20 thereof being connected to an anode 21 of a vapor rectifying device 22. Similarly, the coils 18 and 19 are connected in series relationship with each other, one of their terminals 23 being connected to an anode 24 of the current rectifier. The aforesaid pairs of secondary coils are also connected to each other at a common point 25 which, in turn, is connected, by means of a conductor 26, to a constant-current load 27. The rectified-current circuit is then completed by connecting the cathode 28 of the current rectifier, preferably through an impedance device 29, to the constant-current load 27. In the operation of the regulator, the movable coils 7 and 8 will be closely adjacent when the effective impedance or back electromotive force of the load 27 is highest, but, for intermediate values between no load and full load, the coils will occupy such positions that the current in the rectified-current circuit will be maintained constant with varying load impedance or back electromotive force in the constant-current circuit. At light loads, as is well known, the coils will be maintained far apart, but, at heavy loads, the coils will advance toward each other. When the coils are close together, very little leakage flux passes through the core leg 9, whereas, when the coils are most widely separated, the magnetic induction of the middle leg is comparatively large.

The object of separating the secondary coils 16 and 17 from the secondary coils 18 and 19, said coils supplying alternate half waves of alternating current to the rectifier 22, is to reduce the mutual induction between the two pairs of secondary coils in order to provide a large amount of leakage flux between them. The leakage flux takes the form of a pulsating inductional flux, its effect being to introduce inertia into the system similar to the action of a fly wheel in a mechanical system. In order to provide for a greater sustaining effect for the rectified current, the reactance device 29 may be employed as mentioned above.

It is important, in order to insure efficient operation of the regulator, that the two movable coils 7 and 8 be connected in series circuit with the primary coils 4 and 5 of the potential transformer. Under no-load conditions, the movable coils 7 and 8 are separated from each other the maximum permissible distance, and substantially the entire potential of the primary circuit is consumed in overcoming the impedance of the two movable coils because, in this position, the leakage reactance between the coils reaches its maximum value. In consequence thereof, the leakage flux passes from the central core leg 9 between the two coils, divides into two paths and flows in opposite directions in the outer core legs of the core member 10. As a result, the core is uniformly saturated to a low degree which insures efficient operation of the regulator, or, in other words, very low no-load losses. If one of the movable coils were connected in circuit with the primary winding of the potential transformer, and the other in circuit with the secondary winding, as has been heretofore proposed, the primary winding, under no-load conditions, would divide the potential of the line with the movable coil connected in circuit with it, and, consequently, an uneven flux distribution in the core member 10 would obtain, subjecting portions of the core member to a very high degree of magnetization and other portions to a relatively low degree of magnetization. The uneven flux distribution within the core would increase the no-load losses appreciably.

Another form of my system that is adapted to supply current to a current-rectifying device is shown in Fig. 2, in which only the movable regulator coils 30 and 31 surround a central leg 32 of a core member 33. The outer core legs are severally surrounded by primary coils 34 and 35 and secondary coils 36 and 37, respectively, the primary coils being connected in series with each other and with the regulator coils 30 and 31, as is described above. The anodes of a current-rectifying device 38 are respectively connected to terminals of the secondary coils 36 and 37, and the cathode is connected to the remaining terminals thereof.

With this form of the device, it is unnecessary to employ an additional impedance device for the purpose of sustaining the rectified current, since the desired amount of reactance is provided in the regulator itself. This will be understood from a consideration of the direction of the fluxes produced by the currents traversing the several coils. The primary coils 34 and 35 are so wound as to produce fluxes in the core member that are supplementary or traverse it in the same general direction, as indicated by the broken lines 39, the said fluxes having the direction indicated by the arrows 40 for alternate half-cycles of the alternating-current wave and the direction indicated by the arrows 41 for the other alternate half cycle. When the flux in the core has a direction indicated by the arrows 40, the secondary coil 36 is active, and the primary flux is opposed by the counter-flux of the said secondary coil, which is indicated by the broken lines 42 having a direction indicated by the arrows 43. During the next half cycle, the secondary coil 37 is active, and the primary flux, the direction of which is indicated by the arrows 41, is opposed by the counter-flux which is indicated by the broken line 44 and the direction of which is indicated by the arrows 45. It will be noted that the counter-fluxes indicated by the broken lines 42 and 44 traverse the central leg of the core in the same direction. The effect of this undirectional flux is the same as that resulting from the introduction of inductance into the direct-current circuit of the rectifier, that is to say, it introduces inertia into the system whereby the rectified-current pulsations are minimized. This reactance or sustaining effect is adjusted to the proper value by providing the central leg of the core member with an air gap indicated at 46. The provision of this air gap does not impair the regulation afforded by the movable coils 30 and 31, since the fluxes produced by the said coils oppose each other, and, consequently, they are not effective to send flux through the magnetic circuit in the same direction. As in the preceding regulator, the flux arising from the regulator coils 30 and 31 is low when the load is high, and, under such conditions, the middle leg of the core will be traversed only by the sustaining flux. Since the sustaining flux always traverses the middle leg of the core in the same direction, it first supplements and then opposes the working flux in the core, the result, through a whole cycle, being the same as if the regulator coils were not employed at all.

It will, of course, be understood that, if desired, each half of the secondary winding of the regulator may be divided into two or more parts and may comprise two or more coils which may be connected in series or in parallel relation for the purpose of adapting the device to supply different amounts of current or for the purpose of permitting the employment of two or more current rectifiers. The manner in which the regulator will be constructed for such purposes and in which the connections shall be made will be readily understood from the manner in which transformers are usually constructed and connected for similar purposes, and it is, consequently, deemed unnecessary to illustrate the same here.

When current is to be supplied to a plurality of current-rectifying devices, I prefer to construct the regulating and transforming device as illustrated in Figs. 3 and 4 in which the core member is provided with a central leg 47 and a plurality of outer legs 48, 49, 50 and 51, the central leg being surrounded, as usual, by the movable regulator coils 52, and each of the outer legs being surrounded by primary and secondary coils 53 and 54, respectively. The primary and secondary coils may be connected in many suitable and practical arrangements, but, in Fig. 3, the primary coils surrounding the legs 48 and 50 are shown as connected in series, as are also the primary coils surrounding the legs 49 and 51, and these two series-connected pairs of primary coils are connected in parallel relation with each other and in series with the regulator coils 52. The connections of the rectifying devices to the secondary coils are such that the rectified current passes through the rectifying devices in series. To this end, the anodes of the rectifier 55 are respectively connected to terminals of the secondary coils surrounding the core legs 48 and 50, and the anodes of the rectifier 56 are respectively connected to terminals of the secondary coils surrounding the legs 49 and 51, while the cathode of the device 55 is connected to the remaining terminals of the coils surrounding the legs 49 and 51, and the cathode of the device 56 is connected to the remaining terminals of the coils surrounding the legs 48 and 50, the load 27 to which the rectified current is supplied being preferably included in the latter connection. In some instances, it may be desirable to provide the middle leg 47 of the core with an air gap.

In Fig. 4, the primary coils are all connected in series relation and in series with the movable regulator coils, and current is supplied from the secondary coils to two independent rectifying devices 57 and 58, each supplying its own circuit. The secondary connections are similar to those of Fig. 3, except that the cathodes of the rectifiers are connected through the load devices to the remaining terminals of the same secondary coils as those to which their anodes are respectively connected.

In Figs. 5 and 6, a modified form of a regulating transformer is shown that is similar to that of Figs. 3 and 4 but is adapted to provide a large amount of inductance opposed to the flow of current in the rectifiers, upon the occurrence of short circuits therein. The general form of the core member is similar to that of Figs. 3 and 4, but comprises four similar rectangular portions, each comprising two legs and each similar in shape to the core of a core-type transformer. The four core portions are placed with corresponding legs in juxtaposition, as shown in Fig. 5, to form an assembled core having a middle leg 59 and four outer legs, the middle leg being surrounded by the movable regulator coils 60 and 61.

The coils 62, 63, 64 and 65, which surround the outer legs of the core, are connected in series in pairs, one pair comprising the coils 62 and 65, and the other pair comprising the coils 63 and 64. Both pairs are then connected to each other in parallel relationship and in series with the regulator coils 60 and 61. This form of connection is similar to that shown and described in detail in connection with Fig. 2 where one pair of coils only is connected in series with the regulator coils. The secondary coils 66 and 67, which are simultaneously influenced by the divided currents flowing in the coils 62 and 63, respectively, are connected to the current rectifier 70, one terminal of each of said secondary coils being connected to the cathodes of the rectifier 70 and the other terminals being connected to the anodes. Similarly, the secondary coils 68 and 69, which are simultaneously influenced by the divided currents flowing in the coils 64 and 65, respectively, are connected to the current rectifier 71, one terminal of each of said secondary coils being connected to the cathodes of the rectifier 71 and the other terminals being connected to the anode. The coils are so wound that the magnetic fluxes generated by the secondary coils 66, 67, 68 and 69 during both alternations of the primary current wave, flow through the middle leg 59 of the core in the same direction. The effect of this unidirectional flux through the core leg embraced by the regulating coils 60 and 61 is the same as that which obtains by introducing an inductive-reactance element in the direct-current circuit 62 of the rectifier, as explained in connection with the device of Fig. 2. To obtain further sustaining effect, two impedance devices are connected in the leads extending from the cathodes of the rectifiers. If, with this arrangement of connections, a short circuit occurs in the rectifier 70, for instance, the short-circuit current will traverse secondary coils 66 and 67 and induce currents in the corresponding primary coils. The current induced in the primary coil 63 is thus combined with the current in the primary coil 62, to produce a distortion of the wave form of the primary current. This gives the effect of a high inductance in each branch of the parallel connection that is inserted in series circuit with the regulator coils 60 and 61, thereby limiting the flow of the short-circuit currents.

I claim as my invention:

1. The combination with a regulator comprising a core member having a central leg provided with an air gap and a plurality of outer legs, primary and secondary coils upon the outer legs, and movable coils upon the central leg connected in opposition to each other and in series with the primary coils, the secondary coils upon different legs being connected in series, of current rectifying apparatus having its anodes connected to the terminals of the series-connected secondary coils and a conductor from a cathode connected to a connection between secondary coils.

2. The combination with a regulator comprising a core member having a central leg and a plurality of outer legs, primary and secondary coils upon the outer legs, and movable coils upon the central leg connected in opposition to each other and in series with the primary coils, the secondary coils upon different legs being connected in series, of current rectifying apparatus having its anodes connected to the terminals of the series-connected secondary coils and a conductor from a cathode connected to the connection between said coils.

3. The combination with a regulator comprising a core member having a central leg and a plurality of outer legs, primary and secondary coils upon the outer legs, and movable coils upon the central leg connected in opposition to each other and in series with the primary winding, of current rectifying apparatus supplied from secondary coils upon different legs of the core member.

4. The combination with a regulator comprising a core member having a central leg provided with an air gap and a plurality of outer legs, a primary coil and a secondary coil upon each outer leg, and movable coils upon the central leg connected in opposition to each other and in series with the primary coils, and current rectifying apparatus supplied from secondary coils upon different legs of the core member.

5. The combination with a regulator comprising a core member having a central leg and a plurality of outer legs, primary and secondary coils upon the outer legs, certain of said primary coils being connected in parallel with certain others, and movable coils upon the central leg connected in opposition to each other and in series with the primary coils, and current rectifying apparatus supplied from secondary coils that are located upon different legs of the core member and are associated with parallel-connected primary coils.

6. The combination with a regulator comprising a core member having a central leg and a plurality of outer legs, primary and secondary coils upon the outer legs arranged to produce fluxes in the same direction in the middle leg, and movable coils upon the central leg connected in opposition to each other and in series with the primary coils, and current-rectifying apparatus supplied from secondary coils.

7. The combination with a regulator comprising a core member having a central leg and a plurality of outer legs, primary and secondary coils in inductive relation disposed upon the core legs, movable coils upon the central leg connected in opposition to each other and in series with said primary coils, of current rectifying apparatus having its anodes connected to some of the terminals of the series-connected secondary coils and a conductor extending from a cathode connected to a connection between some of said secondary coils, the secondary coils being so wound that, during their alternate excitation, the fluxes generated by them will flow through said central core leg in the same direction.

8. The combination with a regulator comprising a core member having a central leg and a plurality of outer legs, primary and secondary coils in inductive relation disposed upon the core legs, movable coils upon the central leg connected in opposition to each other and in series with the primary coils, of current rectifying apparatus having anodes connected to the terminals of the series-connected secondary coils and cathodes to the connection between said coils, the secondary coils being so wound that, during their alternate excitation, the fluxes generated by them will flow through said central core leg in the same direction.

9. The combination with a regulator comprising a magnetizable core member having a central core leg and a plurality of outer legs, primary and secondary windings disposed on said core leg, movable coils embracing the central core leg and connected in series with the primary coils, current rectifying apparatus having its anodes connected to terminals of some of said secondary coils and a conductor extending from a cathode connected to an intermediate point between them, said secondary coils being closely inductively related with the primary coils but being separated from one another in order to decrease the mutual induction between them.

10. The combination with a regulator comprising a magnetizable core member having a central core leg and a plurality of outer legs, primary and secondary windings disposed on said core member, movable coils embracing the central core leg and connected in series with the primary coils, current rectifying apparatus having anodes that are severally connected to secondary coils, and a conductor from a cathode that is connected also to secondary coils, said secondary coils being so wound that, during their alternate excitation, the fluxes generated by them will flow through said central core leg in the same direction.

In testimony whereof, I have hereunto subscribed my name this 29th day of June 1916.

CHARLES Le G. FORTESCUE.